(No Model.)

F. KRUSE.
FEED REGULATOR.

No. 302,501. Patented July 22, 1884.

Attest:
Charles Pickles
Edward Starr

Inventor:
Frederick Kruse
By Knight Bros
Attys

UNITED STATES PATENT OFFICE.

FREDERICK KRUSE, OF ST. LOUIS, MISSOURI.

FEED-REGULATOR.

SPECIFICATION forming part of Letters Patent No. 302,501, dated July 22, 1884.

Application filed April 19, 1884. (No model.)

*To all whom it may concern:*

Be it known that I, FREDERICK KRUSE, of the city of St. Louis, in the State of Missouri, have invented a certain new and useful Improvement in Feed-Regulators, of which the following is a full, clear, and exact description, reference being had to the accompanying drawings, forming part of this specification, and in which—

Figure 1:
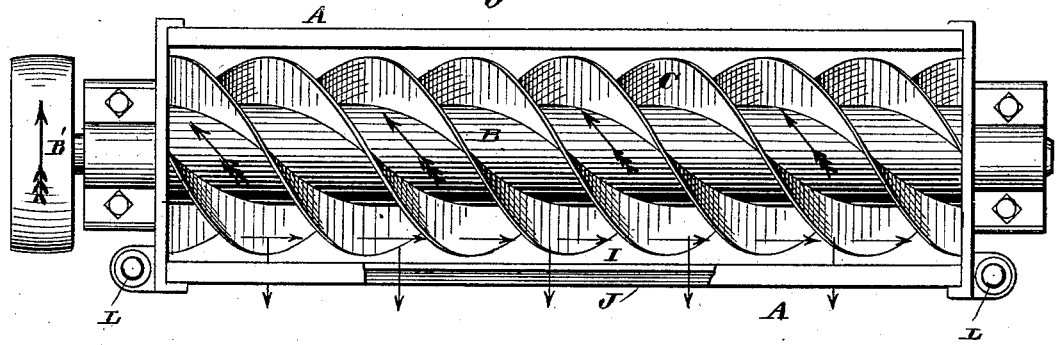
Figure 2:
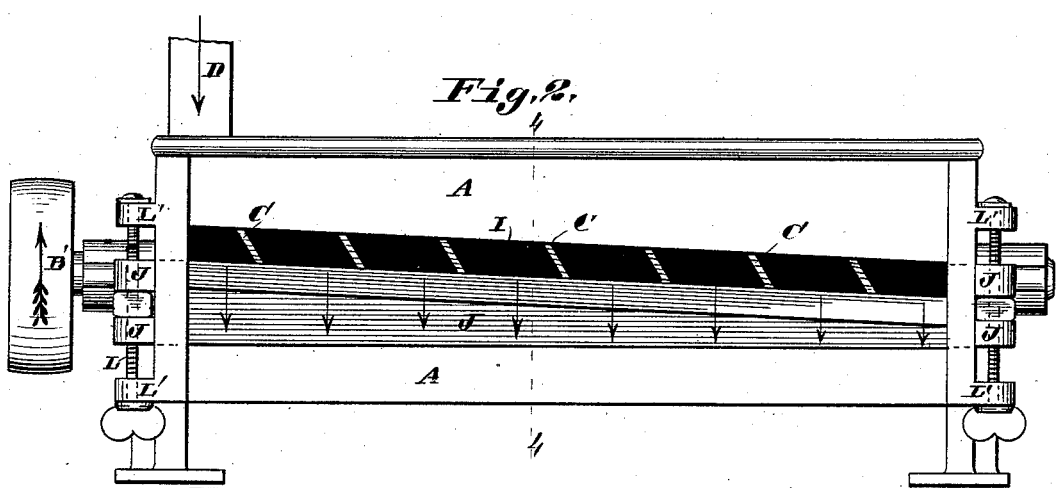
Figure 3:
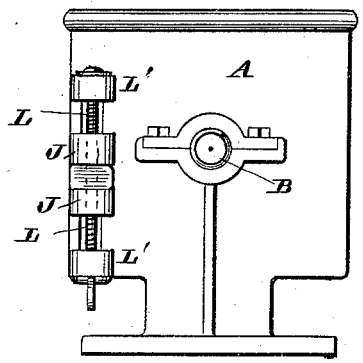
Figure 4:
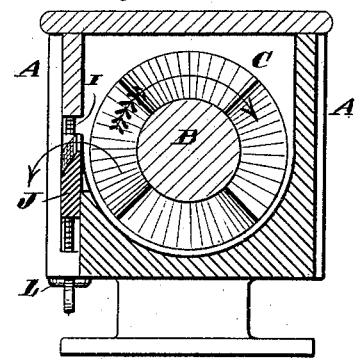

Figure 1 is a plan view, the top and feed-spout being omitted. Fig. 2 is a side elevation. Fig. 3 is an end view, and Fig. 4 is a vertical transverse section taken on the line 4 4, Fig. 2.

My invention relates to an apparatus for feeding flour-rolls, middlings-purifiers, and for use for all such purposes where an even distribution of feed is required, and is adapted either for grain or ground stuff.

My invention consists in features of novelty hereinafter fully described, and pointed out in the claims.

Referring to the drawings, A represents the frame or trough of the conveyer, B the shaft, and C the flights.

B' represents a driving-pulley on the shaft B, and D represents a feed-spout.

In the front wall of the conveyer-trough is an opening, I, at the lower part of which is an inclined longitudinal strip, J, over which the material is thrown in a thin sheet, as shown by the arrows in Figs. 1, 2, and 4. The material is raised by the flights of the conveyer until it comes to the opening I, when it is discharged, and the strip J being inclined highest at the head or feed end of the apparatus, an even sheet of material is discharged, whereas if the strip were straight or horizontal there would likely be a greater discharge at the head than elsewhere, because of the apparatus being fed at that end. The strip is supported on screws L, supported in lugs L', by which it can be raised and lowered to regulate the discharge of the apparatus, and one end can be raised more than or without raising the other end, so that the discharge will be kept uniform throughout the length of the apparatus.

I claim as my invention—

1. In a feed-regulator, the combination of the trough A, having its front wall formed with a longitudinal slot, I, and a conveyer to discharge the material through the wall-slot in a thin sheet, as set forth.

2. The combination of the trough, having an opening in its front wall, conveyer, and adjustable inclined strip, over which the conveyer discharges the material in a thin uniform sheet, substantially as shown and described, for the purpose set forth.

3. The combination of the trough having an opening in its front wall, conveyer, and adjustable inclined strip, and a screw at each end, the material being discharged by the conveyer in a thin uniform sheet, substantially as shown and described.

FREDERICK KRUSE.

In presence of—
GEO. H. KNIGHT.
SAML. KNIGHT.